Patented Dec. 14, 1948

2,456,517

UNITED STATES PATENT OFFICE 2,456,517

CYANOETHYL, ACETO-SUCCINIC ACID ESTERS

Elbert C. Ladd, Passaic, and Homer W. Paxton, Lodi, N. J., assignors to United States Rubber Company, New York, N. Y., a corporation of New Jersey No Drawing. Application February 27, 1948, Serial No. 11,862

4 Claims. (Cl. 260—465.4)

This invention relates to a new class of compounds, alpha-acyl-alpha-(2-cyanoethyl) succinic acid esters and their preparation.

The present chemicals are prepared by the reaction of alpha-acylsuccinic acid esters with acrylonitrile in the presence of an alkaline condensing agent as illustrated by equation 1 below:

(1) 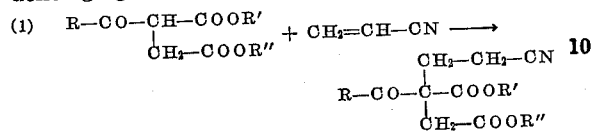

R, R' and R" represent alkyl, e. g., methyl, ethyl, propyl, isopropyl, butyl, isobutyl, amyl, sec.-amyl, hexyl, heptyl, octyl, nonyl and decyl, as well as aryl, e. g., phenyl, tolyl, xylyl, and naphthyl.

Our new compounds are preferably produced by reacting the alpha-acylsuccinic acid esters with an essentially equimolar quantity of acrylonitrile in the presence of a catalytic amount, e. g., 0.1 to 5.0% of a basic condensation catalyst such as alkali metal hydroxides, including sodium and potassium hydroxide, ammonium hydroxide and substituted ammonium hydroxides, e. g., trimethyl benzyl ammonium hydroxide. The reactions proceed readily at moderate temperatures, e. g., 25–50° C. and since many of them are exothermic, cooling is frequently necessary to constrain the reaction temperature within this range. The time of reaction may vary somewhat with the alpha-acylsuccinic acid ester employed, but it seldom exceeds 24 hours, and is markedly less in most cases. The reaction products can be isolated and purified by fractional distillation, crystallization and/or preferential solvent extraction.

Our new compounds are useful for a variety of purposes including chemical intermediates (e. g., alkaline hydroylsis to butane-1,2,4-tricarboxylic acid) and plasticizers for high molecular weight polymers such as polyvinyl chloride and copolymers of isobutylene with acrylonitrile.

The following examples disclose our invention in more detail. All parts are by weight.

Example 1

Eighteen parts of acrylic nitrile are added to a mixture of 64.8 parts of diethyl alpha-acetylsuccinate and 2.25 parts of 50% aqueous potassium hydroxide. The exothermic reaction is allowed to proceed for approximately 20 hours, the temperature being maintained within the range of 30–35° C. by occasional cooling. The reaction mixture in the form of a viscous oil, is diluted with 2 volumes of chloroform and washed successively with several portions each of dilute sulfuric acid and of water. After drying the solution, the chloroform is removed by evaporation and the residue is fractionally distilled to yield 49 parts of the liquid diethyl alpha-acetyl-alpha-(2-cyanoethyl) succinate, b. 154–9° C.; $n_D^{20}$ 1.4556; sp. g. (20°/20°) 1.1186.

| Analysis: | C | H | N |
|---|---|---|---|
| Found | 58.15% | 7.05% | 5.07% |
| Theory | 58.00% | 7.07% | 5.20% |

Example 2

Four parts of the diethyl alpha-acetyl-alpha-(2-cyanoethyl) succinate, prepared above in Example 1 are milled into 5 parts of an isobutylene-acrylic nitrile copolymer (% N, 19.24; intrinsic viscosity, 0.9) to give a clear, soft, flexible sheet.

A similarly tough flexible sheet is obtained when 4 parts of the diethyl alpha-acetyl-alpha-(2-cyanoethyl)succinate are milled into 5 parts of polyvinyl chloride (intrinsic viscosity in cyclohexanone 1.32).

Example 3

One and five-tenths parts of 50% aqueous potassium hydroxide are added to a mixture of 73.2 parts of diethyl alpha-butyrosuccinate and 18.0 parts of acrylic nitrile. The temperature of the mildly exothermic reaction is maintained below 40° C. by occasional cooling. At the end of approximately 20 hours the reaction mixture is diluted with two volumes of chloroform and washed successively with dilute aqueous sodium bicarbonate, dilute aqueous sulfuric acid and water. After drying the solution, the chloroform is removed by evaporation and the residue is fractionally distilled to yield 34.3 parts of diethyl alpha-butyryl-alpha-(2-cyanoethyl) succinate, b. 155–8° C./1 mm.; $n_D^{20}$ 1.4563; sp. g. (20°/20°) 1.084.

Analysis: found, 4.7% N; theory, 4.7%.

(a) Four parts of diethyl alpha-butyryl-alpha-(2-cyanoethyl)succinate are milled into 5 parts of polyvinyl chloride to form a clear, tough, flexible sheet.

Having thus described our invention, what we claim and desire to protect by Letters Patent is:

1. An alpha-acyl-alpha-(2-cyanoethyl) succinic acid ester.

2. An alpha-acetyl-alpha-(2-cyanoethyl) succinic acid ester.

3. An alpha-butyryl-alpha-(2-cyanoethyl) succinic acid ester.

4. Diethyl alpha-acetyl-alpha-(2-cyanoethyl) succinate.

ELBERT C. LADD.
HOMER W. PAXTON.

REFERENCES CITED

The following references are of record in the file of this patent:

UNITED STATES PATENTS

| Number | Name | Date |
|---|---|---|
| 2,394,962 | Bruson | Feb. 12, 1946 |
| 2,396,626 | Wiest | Mar. 12, 1946 |

OTHER REFERENCES

Mitter et al., Chem. Abstracts, vol. 22, page 3882 (1928).